(12) United States Patent
Lindell et al.

(10) Patent No.: US 12,489,130 B2
(45) Date of Patent: Dec. 2, 2025

(54) FLUOROPOLYMER COMPRISING PENDENT GROUPS WITH IONIC BIS(SULFONYL)IMIDE MOIETY AND PERFLUOROETHER TERMINAL GROUP

(71) Applicant: 3M INNOVATIVE PROPERTIES COMPANY, St. Paul, MN (US)

(72) Inventors: Matthew J. Lindell, Woodbury, MN (US); Michael A. Yandrasits, Hastings, MN (US); Andrew T. Haug, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 593 days.

(21) Appl. No.: 17/909,833

(22) PCT Filed: Mar. 5, 2021

(86) PCT No.: PCT/IB2021/051849
§ 371 (c)(1),
(2) Date: Sep. 7, 2022

(87) PCT Pub. No.: WO2021/198808
PCT Pub. Date: Oct. 7, 2021

(65) Prior Publication Data
US 2024/0204227 A1 Jun. 20, 2024

Related U.S. Application Data

(60) Provisional application No. 63/001,716, filed on Mar. 30, 2020.

(51) Int. Cl.
| | |
|---|---|
| C08F 8/34 | (2006.01) |
| C08F 8/44 | (2006.01) |
| C08F 214/26 | (2006.01) |
| C08G 65/00 | (2006.01) |
| C08G 65/334 | (2006.01) |
| H01M 8/1027 | (2016.01) |
| H01M 8/103 | (2016.01) |
| H01M 8/1032 | (2016.01) |
| H01M 8/1039 | (2016.01) |
| H01M 8/10 | (2016.01) |

(52) U.S. Cl.
CPC ............ H01M 8/1039 (2013.01); C08F 8/34 (2013.01); C08F 8/44 (2013.01); C08F 214/262 (2013.01); C08G 65/007 (2013.01); C08G 65/3348 (2013.01); H01M 8/1027 (2013.01); H01M 8/103 (2013.01); H01M 8/1032 (2013.01); C08G 2650/48 (2013.01); H01M 2008/1095 (2013.01)

(58) Field of Classification Search
CPC ...... C08F 8/34; C08G 65/007; C08G 65/3348
See application file for complete search history.

(56) References Cited

U.S. PATENT DOCUMENTS

| | | | |
|---|---|---|---|
| 2,732,398 A | 1/1956 | Brice et al. | |
| 3,865,845 A | 2/1975 | Resnick | |
| 3,978,030 A | 8/1976 | Resnick | |
| 4,935,477 A | 6/1990 | Squire | |
| 5,463,005 A | 10/1995 | Desmarteau | |
| 6,268,430 B1 | 7/2001 | Choi et al. | |
| 6,274,677 B1 | 8/2001 | Tatemoto | |
| 6,624,328 B1 | 9/2003 | Guerra et al. | |
| 6,790,990 B2 | 9/2004 | Blau | |
| 7,094,851 B2 | 8/2006 | Wu et al. | |
| 7,220,508 B2 | 5/2007 | Watakabe et al. | |
| 7,285,349 B2 | 10/2007 | Hamrock et al. | |
| 7,288,600 B2 | 10/2007 | Moya | |
| 7,348,088 B2 | 3/2008 | Hamrock et al. | |
| 7,348,386 B2 | 3/2008 | Arase et al. | |
| 7,470,749 B2 | 12/2008 | Watakabe et al. | |
| 7,473,748 B2 | 1/2009 | Hoshi et al. | |
| 7,482,415 B2 | 1/2009 | Tatemoto et al. | |
| 7,575,534 B2 | 8/2009 | Gleasman et al. | |
| 7,799,468 B2 | 9/2010 | Watakabe et al. | |
| 8,367,267 B2 | 2/2013 | Frey et al. | |
| 8,557,474 B2 | 10/2013 | Watakabe et al. | |
| 8,628,871 B2 | 1/2014 | Frey et al. | |
| 9,086,872 B2 | 7/2015 | Hargil et al. | |
| 9,419,300 B2 | 8/2016 | Hamrock et al. | |
| 9,431,677 B2 | 8/2016 | Bouchet et al. | |
| 9,434,679 B2 | 9/2016 | Merlo et al. | |

(Continued)

FOREIGN PATENT DOCUMENTS

| | | |
|---|---|---|
| CA | 2949641 A1 | 6/2019 |
| CN | 103874724 A | 6/2014 |

(Continued)

OTHER PUBLICATIONS

Machine translation into English of CN-104447435-A (Year: 2015).*
Alentiev, "Gas and Vapor Sorption, Permeation, and Diffusion in Glassy Amorphous Teflon AF1600," Macromolecules, 2002, vol. 35, No. 25, pp. 9513-9522.
Desmarteau, "Novel perfluorinated ionomers and ionenes", Journal of fluorine chemistry, 1995, vol. 72, No. 2, pp. 203-208.
Gramstad, "Perfluoroalkyl derivatives of sulphur. Part IV. Perfluoroalkanesulphonic acids", Journal of the Chemical Society, 1956, pp. 173-180.
International Search Report for PCT International Application No. PCT/IB2021/051849, mailed on May 19, 2021, 4 pages.

(Continued)

*Primary Examiner* — Karuna P Reddy
(74) *Attorney, Agent, or Firm* — Carolyn A. Fischer

(57) ABSTRACT

A fluoropolymer is described comprising pendent groups having the formula: $-(CF_2)_a-(OC_bF_{2b})_c-(OC_eF_{2e})-SO_2-[NX^2-SO_2(CF_2)_f-SO_2]_d-NX^1-SO_2-Rf$ wherein Rf is a perfluoroether and $X^1$ and $X^2$ are independently cationic counterions. Also described are various articles including catalyst ink, polymer electrolyte membranes, and membrane electrode assemblies comprising the fluoropolymer described herein; as well as a method of making a fluoropolymer.

14 Claims, No Drawings

(56) References Cited

U.S. PATENT DOCUMENTS

| | | | |
|---|---|---|---|
| 10,189,927 B2 | 1/2019 | Ino et al. | |
| 2002/0160272 A1 | 10/2002 | Tanaka et al. | |
| 2004/0107869 A1 | 6/2004 | Velamakanni et al. | |
| 2010/0273088 A1* | 10/2010 | Ino | C08F 8/06 429/529 |
| 2013/0053459 A1 | 2/2013 | Tayanagi et al. | |
| 2013/0065114 A1 | 3/2013 | Shinohara et al. | |
| 2013/0252134 A1 | 9/2013 | Takami et al. | |
| 2015/0202617 A1 | 7/2015 | Hirai | |
| 2016/0104896 A1 | 4/2016 | Nishida et al. | |
| 2019/0027769 A1 | 1/2019 | Dahlke et al. | |
| 2019/0256778 A1 | 8/2019 | Kim et al. | |

FOREIGN PATENT DOCUMENTS

| | | | |
|---|---|---|---|
| CN | 104447435 A * | 3/2015 | |
| CN | 108779209 A | 11/2018 | |
| JP | 2000188111 A | 7/2000 | |
| JP | 2002260705 A | 9/2002 | |
| JP | 2005314388 A | 11/2005 | |
| JP | 2006-032157 A | 2/2006 | |
| JP | 2006152249 A | 6/2006 | |
| JP | 2011040363 A | 2/2011 | |
| JP | 2011140605 A | 7/2011 | |
| JP | 4788267 B2 | 10/2011 | |
| JP | 4815672 B2 | 11/2011 | |
| JP | 2011241344 A | 12/2011 | |
| JP | 4867843 B2 | 2/2012 | |
| JP | 2012084398 A | 4/2012 | |
| JP | 2012226970 A | 11/2012 | |
| JP | 2013-064107 A | 4/2013 | |
| JP | 5287245 B2 | 9/2013 | |
| JP | 2013216811 A | 10/2013 | |
| JP | 2014063522 A | 4/2014 | |
| JP | 5540681 B2 | 7/2014 | |
| JP | 2014216157 A2 | 11/2014 | |
| JP | 5765898 B2 | 8/2015 | |
| JP | 2015183167 A | 10/2015 | |
| JP | 2016006173 A | 1/2016 | |
| JP | 2016074167 A | 5/2016 | |
| JP | 2016103470 A | 6/2016 | |
| JP | 6049670 B2 | 12/2016 | |
| JP | 2020-534402 A | 11/2020 | |
| WO | 200077057 A3 | 12/2000 | |
| WO | 2004007576 A1 | 1/2004 | |
| WO | 2007013533 A1 | 2/2007 | |
| WO | 2012088176 A9 | 6/2012 | |
| WO | 2016089658 A1 | 6/2016 | |
| WO | 2017053563 A1 | 3/2017 | |
| WO | 2019044476 A1 | 3/2019 | |
| WO | 2019055793 A1 | 3/2019 | |
| WO | 2019055799 A1 | 3/2019 | |
| WO | 2021127346 A1 | 6/2021 | |

OTHER PUBLICATIONS

Karan, "PEFC catalyst layer: Recent advances in materials, microstructural characterization, and modeling", Current opinion in electrochemistry, 2017, vol. 5, No. 1, pp. 27-35.

Kinoshita, "Development of PFSA Ionomers for the Membrane and the Electrodes", ECS Transactions, 2014, vol. 64, No. 3, pp. 371-375.

Kodama, "Catalyst Poisoning Property of Sulfonimide Acid Ionomer on Pt (111) Surface", Journal of The Electrochemical Society, 2014, vol. 161, No. 5, pp. F649-F652.

Kodama, "Effect of the Side-Chain Structure of Perfluoro-Sulfonic Acid Ionomers on the Oxygen Reduction Reaction on the Surface of Pt", ACS catalysis, 2018, vol. 8, No. 1, pp. 694-700.

Kongkanand, "The Priority and Challenge of High-Power Performance of Low Platinum Proton-Exchange Membrane Fuel Cells", The Journal of Physical Chemistry Letters, 2016, vol. 7, No. 7, pp. 1127-1137.

Mohamed, "Free volume and permeabilities of O2 and H2 in Nafion membranes for polymer electrolyte fuel cells", Polymer, 2008, vol. 49, No. 13-14, pp. 3091-3097.

Pinnau, "Gas and vapor transport properties of amorphous perfluorinated copolymer membranes based on 2,2-bistrifluoromethyl-4,5-difluoro-I,3-dioxole/tetrafluoroethylene", Journal of Membrane Science, 1996, vol. 109, No. 1, pp. 125-133.

Rolfi, "New perfluorinated ionomer with improved oxygen permeability for application in cathode polymeric electrolyte membrane fuel cell", Journal of Power Sources, 2018, vol. 396, pp. 95-101.

Savett, "A Comparison of Bis[(perfluoroalkyl)sulfonyl]imide Ionomers and PFSA Ionomers for Applications in PEMFC Technology," Journal of the Electrochemical Society, 2002, vol. 149, No. 12, pp. A1527-A1532.

Shimizu, "Effects of Both Oxygen Permeability and Ion Exchange Capacity for Cathode Ionomers on the Performance and Durability of Polymer Electrolyte Fuel Cells", Journal of the Electrochemical Society, 2018, vol. 165, No. 6, pp. F3063-F3071.

Shinohara, "Non-Crosslinked perfluoro-polymer electrolytes with two acid groups and their properties", Abstract #1282, 224th the Electronic Society Meeting, 2013, 1 page.

Spulber, "Fragmentation of Perfluorinated Membranes Used in Fuel Cells: Detecting Very Early Events by Selective Encapsulation of Short-Lived Fragments in β-Cyclodextrin", Journal of Physical Chemistry B, 2011, vol. 115, pp. 12415-12421.

Su, "Chemical and Morphological Origins of Improved Ion Conductivity in Perfluoro Ionene Chain Extended Ionomers", Journal of the American Chemical Society, 2019, vol. 141, No. 34, pp. 13547-13561.

Weber, "Unexplained transport resistances for low-loaded fuel-cell catalyst layers", Journal of Materials Chemistry. A, 2014, vol. 2, No. 41, pp. 17207-17211.

Yamada, "Effect of High Oxygen Permeable Ionomers on MEA Performance for PEFC", ECS Transactions, 2012, vol. 50, No. 2, pp. 1495-1501.

Yamaguchi, "Vibrational Analysis of Side Chain Model Compounds of Perfluorinated Alkyl Sulfonic Acid Ionomers", Journal of Physical Chemistry A, 2012, vol. 116, pp. 10850-10863.

Yandrasits, "Increasing Fuel Cell Efficiency by Using Ultra-Low Equivalent weight Ionomers", The Electrochemical Society Interface, Jan. 2017, vol. 26, No. 1, pp. 49-53, XP055800281.

Zhang, "Electrochemical Measurement of the Oxygen Permeation Rate through Polymer Electrolyte Membranes", Journal of The Electrochemical Society, 2013, vol. 160, No. 6, pp. F616-F622.

Zhou, "Chemical Durability Studies of Perfluorinated Sulfonic Acid Polymers and Model Compounds under Mimic Fuel Cell Conditions", Macromolecules, 2007, vol. 40, No. 24, pp. 8695-8707.

Zhu, "Synthesis and Characterization of a Novel Perfluorinated Ionomer Polymer Containing Sulfonimide Functionality", Chinese journal of chemistry, 2003, vol. 21, No. 7, pp. 921-925.

* cited by examiner

FLUOROPOLYMER COMPRISING PENDENT GROUPS WITH IONIC BIS(SULFONYL)IMIDE MOIETY AND PERFLUOROETHER TERMINAL GROUP

This invention was made with Government support under Cooperative Agreement DE-EE0007650 awarded by DOE. The Government has certain rights in this invention.

BACKGROUND

Various fluoropolymers comprising pendent ionic groups have been described. (See for example U.S. Pat. No. 7,348,088.) Such fluoropolymers are suitable for polymer electrolyte membranes of electrochemical fuel cells.

SUMMARY

Industry would find advantage in fluoropolymers comprising pendent groups with one or more ionic bis(sulfonyl)imide moieties and a perfluoroether terminal group having improved properties such as high oxygen permeability.

In one embodiment, a fluoropolymer is described comprising pendent groups having the formula:

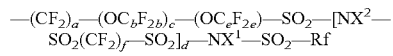

wherein Rf is a perfluoroether and $X^1$ and $X^2$ are independently cationic counterions.

Also described are various articles including catalyst ink, polymer electrolyte membranes, and membrane electrode assemblies comprising the fluoropolymer described herein; as well as a methods of making a fluoropolymer.

DETAILED DESCRIPTION

Presently described are fluoropolymers comprising pendent groups. At least a portion of the pendent groups comprise a perfluoroether terminal group. The pendent groups further comprise one or more bis(sulfonyl)imide moieties and cationic counterions, such a hydrogen ion ($H^+$).

The pendent groups of the fluoropolymer typically have the following formula:

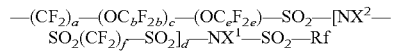

wherein
Rf is a perfluoroether;
a is 0 or 1;
c is 0, 1, or 2;
b, e and f independently range from 2 to 6;
d is 0, 1, or greater than 1;
$X^1$ and $X^2$ are independently cationic counterions (including $H^+$).

In some embodiments, c is 1 or greater than 1 (e.g. 2). When c is at least 1, b is independently an integer from 2 to 6. In some embodiments, b is less than 7, 6, 5, or 4. In some embodiments, b is 3.

In some embodiments, a and c are 0, d is 1 or greater than 1, and the pendent groups have the formula:

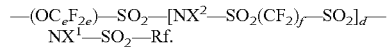

In some embodiments, d is typically no greater than 4, 3, or 2.

In some embodiments, a, c, and d are each zero and pendent groups have the formula:

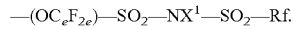

In each of these embodiments, Rf is typically a single perfluoroether group having 3, 4, 5, 6, 7, 8, 9, 10, 11, or 12 perfluorinated carbon atoms, as well as any range derived from these integers. For example, the perfluoroether group may comprise 3 to 6 perfluorinated carbon atoms. In some embodiments, Rf is a polyperfluoroether comprising two perfluoroether groups wherein each of the perfluoroether groups independently comprise 3-12 carbon atoms as just described, as well as any range derived from these integers.

In some embodiments, e is 2, 3, 4, 5, or 6 as well as any range derived from these integers such as 2 to 4 or 3 to 6.

In some embodiments, f is 2, 3, 4, 5, or 6 as well as any range derived from these integers such as 2 to 4 or 3 to 6.

The fluoropolymer typically comprises 5 to 50 mol % of polymerized monomers bearing pendent groups comprising a perfluoroether terminal group, based on the total moles of polymerized monomers of the fluoropolymer. In some embodiments, the fluoropolymer comprises at least 6, 7, 8, 9, 10, 11, 12, 13, 14, 15, 16, 17, 18, 19, or 20 mol % of polymerized monomers bearing pendent groups comprising a perfluoroether terminal group. In some embodiments, the fluoropolymer comprises less than 45, 40, 35, 30, or 25 mol % of polymerized monomers bearing pendent groups comprising a perfluoroether terminal group.

The fluoropolymer typically comprises polymerized monomer(s) bearing other pendent groups that comprise a different terminal group that is not a perfluoroether terminal group. In some embodiments, the fluoropolymer further comprises pendent groups that comprise a sulfonic acid (—$SO_3H$) terminal group. In some embodiments, the fluoropolymer further comprises pendent groups that comprise a sulfonamide (—$SO_2NH_2$) terminal group. The fluoropolymer typically comprises no greater than 10, 9, 8, 7, 6, 5, 4, 3, 2, or 1 mol % of polymerized monomer(s) bearing pendent groups that comprise a different (e.g. sulfonic acid, sulfonamide) terminal group that is not a perfluoroether terminal group. Such other pendent groups that comprise a different terminal group that is not a perfluoroether terminal group may or may not comprise a bis(sulfonyl)imide moiety. The relative percentages of the various moieties of the pendent groups can be determined by nuclear magnetic resonance (NMR) spectroscopy, as discussed in the Examples below.

The pendent groups are covalently bonded to a fluoropolymer backbone. The backbone of the fluoropolymer typically comprises polymerized (e.g. repeat) units of —[$CF_2$—$CF_2$]—. In typical embodiments, at least 50 mol % of the polymerized (e.g. repeat) units of —[$CF_2$—$CF_2$]— are derived from the polymerization of tetrafluoroethylene (TFE). In some embodiments, the fluoropolymer comprises at least 50, 55, 60, 65, 70, 75, 80, 90 or 95 mole % of polymerized units of $CF_2$=$CF_2$. i.e. tetrafluoroethylene, based on the total moles of polymerized monomers of the fluoropolymer. The backbone of the fluoropolymer further comprises units of —[$CF_2$—$CF$]— derived from polymerization of the unsaturated group of perfluorinated sulfonyl halide monomer(s). The carbon atom of each CF of —[$CF_2$—$CF$]— is bonded to a pendent group as described herein.

Various other monomers can be used in the preparation of the fluoropolymer provided the inclusion of such does not detract from the desired properties (e.g. oxygen permeability) of the fluoropolymer.

The fluoropolymer can be made by any suitable method. One embodied method of preparing the fluoropolymer, described in greater detail in the examples, comprises i) providing a first fluoropolymer intermediate comprising a fluoropolymer backbone and pendent groups terminating with sulfonyl halide (e.g. —SO$_2$F);
ii) reacting the sulfonyl halide groups of the first fluoropolymer intermediate with ammonia to produce a sulfonamide ammonium salt and ion exchanging to remove a proton from the ammonium with an aprotic amine base (e.g., tertiary amine such as triethylamine, (TEA)) to form a second fluoropolymer intermediate terminating with a sulfonamide salt (e.g. —SO$_2$NH$^-$ TEAH+); iii) reacting the sulfonamide salt of the second fluoropolymer intermediate with a perfluorinated disulfonyl halide and aprotic amine base (e.g. tertiary amine) to form a third fluoropolymer intermediate terminating with a bis(sulfonyl)imide sulfonyl halide (e.g. —SO$_2$N$^-$(TEAH$^+$)SO$_2$(CF$_2$)$_f$SO$_2$F);
iv) reacting the bis(sulfonyl)imide sulfonyl halide of the third fluoropolymer intermediate with ammonia to form a fourth fluoropolymer intermediate terminating with a bis(sulfonyl)imide salt terminating with an ammonium ion (e.g. —SO$_2$N$^-$(TEAH$^+$)SO$_2$(CF$_2$)$_f$SO$_2$NH(NH$_4$$^+$);
v) optionally purifying and ion exchanging the fourth fluoropolymer intermediate to remove the ammonium ion and convert the terminal sulfonamide to a neutral form (e.g. —SO$_2$NHSO$_2$(CF$_2$)$_f$SO$_2$NH$_2$) or a sulfonamide salt (—SO$_2$NHSO$_2$(CF$_2$)$_f$SO$_2$NH$^-$TEAH$^+$) that is reactive with an aprotic amine base (e.g., tertiary amine);
vi) reacting the optionally purified and ion exchanged fourth fluoropolymer intermediate with an aprotic amine base (e.g., tertiary amine) and perfluoroether sulfonyl halide to covalently bond a terminal perfluoroether group; and
vii) optionally purifying and ion exchanging the fluoropolymer of vi).

In some embodiments, the method further comprises repeating steps iii) through iv) and optionally v) prior to vi); wherein d of the above formula is the number of times steps ii) and iv) are performed.

In some embodiments, wherein d is zero, steps i), ii), vi) and vii) are performed. In other words steps 3-5 are excluded during the method of synthesis when d is zero.

The pendent groups of the fluoropolymer intermediates described above can further comprise perfluoroalkylene groups, perfluoroether groups, or a combination thereof. The perfluoroalkylene groups and/or perfluoroether groups can be present between the fluoropolymer backbone and (e.g. first) bis(sulfonyl)imide group(s) according to the various pendent group formulas described herein.

In some embodiments, the first fluoropolymer intermediate can be prepared by reacting tetrafluoroethylene (TFE) and an unsaturated perfluorinated sulfonyl halide (e.g. fluoride) monomer.

A perfluorinated sulfonyl halide (e.g. fluoride) monomer is also utilized in step iii) of the above described synthesis.

In some embodiments, the unsaturated perfluorinated sulfonyl halide (e.g. fluoride) monomer
has the formula $$CF_2=CF-(OC_eF_{2e})SO_2F$$

wherein e independently ranges from 2 to 6 as defined by the formulas above.

Suitable sulfonyl fluoride or sulfonyl chloride compounds are described in the literature including for example 1,1,2,2-tetrafluoroethyl-1,3-disulfonyl fluoride; 1,1,2,2,3,3-hexafluoropropyl-1,3-disulfonyl fluoride; 1,1,2,2,3,3,4,4-octafluorobutyl-1,4-disulfonyl fluoride; 1,1,2,2,3,3,4,4,5,5-perfluoropentyl-1,5-disulfonyl fluoride; 1,1,2,2-tetrafluoroethyl-1,2-disulfonyl chloride; 1,1,2,2,3,3-hexafluoropropyl-1,3-disulfonyl chloride; 1,1,2,2,3,3,4,4-octafluorobutyl-1,4-disulfonyl chloride; and 1,1,2,2,3,3,4,4,5,5-perfluoropentyl-1,5-disulfonyl chloride.

Perfluoroalkyl sulfonyl fluoride monomer can be made according to the procedures disclosed in WO2004/060857. The polymerization can be conducted by first making a pre-emulsion of the unsaturated perfluoroalkyl sulfonyl fluoride monomer in water with ammonium perfluorooctanoate (APFO) as an emulsifier by high shear mixing using an Ultraturrax agitator. The pre-emulsion can then be reacted with TFE with addition of an initiator. In this embodiment, a and c of the above formulas are zero.

In other embodiments, wherein c is at least 1, the unsaturated perfluorinated sulfonyl halide (e.g. fluoride) monomer can have the formula $$CF_2=CF-(OC_bF_{2b})_c(OC_eF_{2e})SO_2F$$

In one embodiment, b is 3 and e is 2.

In yet another embodiment, wherein a is at least 1, the unsaturated perfluorinated sulfonyl halide (e.g. fluoride) monomer can have the formula $$CF_2=CF-(CF_2)_a(OC_eF_{2e})SO_2F$$

Starting monomers wherein c is at least 1 or a is at 1 are known in the literature (see US 943466792). In each of these formulas, F (i.e., fluoride) can alternatively be a different halide, such as chloride.

In some embodiments, the first fluoropolymer intermediate is prepared from a single sulfonyl halide. In other embodiments, the first fluoropolymer intermediate is prepared from more than one sulfonyl halide. In some embodiments, step iii) utilizes a single disulfonyl halide. In other embodiments, step iii) utilized more than one disulfonyl halide.

The aprotic amine base may also be characterized as a catalyst. Suitable aprotic amine catalytic bases include tertiary amines: pyridine, trialkylamines such as N,N-diisopropylethylamine (DIPEA, or Hunig's base), triethylamine, tripropylamine, diazabicycloundecene (DBU).

The reaction may be carried out, for example, in a suitable (dry) polar aprotic solvent that is miscible. Non-limiting examples of suitable polar aprotic solvents may include acetonitrile, tetrahydrofuran, N,N-dimethylformamide (DMF), N,N-dimethylacetamide (DMAc), dimethylsulfoxide (DMSO), N-methylpyrrolidinone (NMP), tetrahydrofuran (THF), methyl tert-butyl ether (MTBE), and combinations thereof. Suitable temperatures for the preparation of each of the fluoropolymer intermediates are described in the forthcoming examples.

In some embodiments, the fluoropolymer is formed into an aqueous dispersion. The step of purifying and/or ion exchanging typically also comprises dispersing the fluoropolymer intermediate in water or a water-miscible solvent mixture. The fluoropolymer can typically be dispersed at a concentration of at least 10, 15, 20, or 25 percent by weight in a solution of water and organic solvent. In some embodiments, the dispersion may contain up to 30, 40, or 50 percent by weight of fluoropolymer dispersed in a solution of water and organic solvent. In some embodiments, higher concentration may be made by removing water and organic solvent from dispersions having a low concentration of fluoropolymer. Examples of suitable organic solvents useful for preparing fluoropolymer dispersions of the copolymer include lower alcohols (e.g., methanol, ethanol, isopropanol, n-propanol), polyols (e.g., ethylene glycol, propylene glycol, glycerol), ethers (e.g., tetrahydrofuran and dioxane), diglyme, polyglycol ethers, ether acetates, acetonitrile, acetone, dimethylsulfoxide (DMSO), N,N dimethylacetamide (DMA), ethylene carbonate, propylene carbonate, dimethylcarbonate, diethylcarbonate, N,N-dimethylformamide (DMF), N-methylpyrrolidinone (NMP), dimethylimidazolidinone, butyrolactone, hexamethylphosphoric triamide (HMPT), isobutyl methyl ketone, sulfolane, and combinations thereof. In some embodiments, the fluoropolymer, water, and organic solvent can be heated to a temperature of about 250° C. In other embodiments, lower temperatures may be used in combination with pressure.

In some embodiments, the obtained fluoropolymer dispersion is purified by at least one of anion- or cation-exchange processes or ultrafiltration by tangential flow filtration or cross-flow filtration to remove functional comonomers, anions, and/or cations before coagulation or spray drying (described below). As used herein, the term "purify" refers to at least partially removing impurities, regardless of whether the removal is complete. Anionic species that may constitute impurities include, for example, fluoride, anionic residues from surfactants and emulsifiers (e.g., perfluorooctanoate), residual compounds, and fluoropolymer with pendent groups lacking a perfluoroether or polyperfluoroether terminal group. It should be noted, however, that it may be desirable to not remove ionic fluoropolymer containing pendent groups lacking a perfluoroether terminal group from the dispersion. Useful anion exchange resins typically comprise a polymer (typically crosslinked) that has a plurality of cationic groups (e.g., quaternary alkyl ammonium groups) paired with various anions (e.g., halide or hydroxide). Upon contact with the fluoropolymer dispersion, anionic impurities in the dispersion become associated with the anion exchange resin. After the anion exchange step, the resultant anion-exchanged dispersion is separated from the anion exchange resin, for example, by filtration. Typically, better yields are obtained using gel-type anion-exchange resins than with macroporous anion exchange resins. Typically, best yields are obtained by ultrafiltration in which the filtration membrane pore size is small enough to retain fluoropolymer but large enough to allow solvent and impurities to pass through.

Examples of cationic impurities resulting from the above-mentioned polymerization include one or more of alkali metal cation(s) (e.g., $Li^+$, $Na^+$, $K^+$), ammonium, quaternary alkyl ammonium, alkaline earth cations (e.g., $Mg^{2+}$, $Ca^{2+}$), manganese cations (e.g., $Mn^{2+}$), and Group III metal cations. Useful cation exchange resins include polymers (typically cross-linked) that have a plurality of pendant anionic or acidic groups such as, for example, polysulfonates or polysulfonic acids, polycarboxylates or polycarboxylic acids. The metal ion content of the copolymer can be measured by flame atomic absorption spectrometry after combusting the copolymer and dissolving the residue in an acidic aqueous solution. For potassium as the analyte, the lower detection limit is typically less than 1 ppm.

Examples of useful sulfonic acid cation exchange resins include sulfonated styrene-divinylbenzene copolymers, sulfonated crosslinked styrene polymers, phenol-formaldehyde-sulfonic acid resins, and benzene-formaldehyde-sulfonic acid resins. Carboxylic acid cation exchange resin is an organic acid, cation exchange resin. Cation exchange resins are available commercially from a variety of sources. Cation exchange resins are commonly supplied commercially in either their acid form or their sodium form. If the cation exchange resin is not in the acid form (i.e., protonated form) it may be at least partially or fully converted to the acid form in order to avoid the generally undesired introduction of other cations into the dispersion. This conversion to the acid form may be accomplished by means well known in the art, for example by treatment with any adequately strong acid. Besides removing impurities from the fluoropolymer dispersion, the cation exchange resin may also produce the acidic form of the fluoropolymer pendent groups.

The fluoropolymer typically has an equivalent weight (EW) of at least 600, 700, 750, or 800 g/equivalent. In some embodiments, the fluoropolymer has an equivalent weight (EW) of greater than 800, more typically greater than 900, more typically greater than 1000. In some embodiments, the fluoropolymer typically has an equivalent weight (EW) of less than 1200, more typically less than 1100. The equivalent weight can be determined according to the test method described in the examples.

In some favored embodiments, the moieties of the fluoropolymer backbone and pendent groups are selected to provide high oxygen permeability.

The oxygen permeability coefficient can be determined by at least two methods as described in the examples. The oxygen permeability can vary depending on the relative humidity and temperature.

In some embodiments, the fluoropolymer has an electrochemical oxygen permeability coefficient (as determined by Test Method 1) at 80° C. of at least 1.1E-13 (i.e., $1.1 \times 10^{-13}$) at 25% relative humidity. In some embodiments, the electrochemical oxygen permeability coefficient of the fluoropolymer at 80° C. and 25% relative humidity is at least 1.5E-13 or 2E-13. In some embodiments, the electrochemical oxygen permeability coefficient of the fluoropolymer at 80° C. and 50% relative humidity is at least 1.5E-13, 2.0E-13, or 2.5E-13. In some embodiments, the electrochemical oxygen permeability coefficient of the fluoropolymer at 80° C. and 100% relative humidity is at least 2.1E-13, 2.2E-13, 2.3E-13, 2.4E-13, 2.5E-13, 2.6 E-13, 2.7 E-13, 2.8 E-13, or 2.9 E-13 at 80° C. and 100% relative humidity at 100% relative humidity. In some embodiments, the electrochemical oxygen permeability coefficient is no greater than 2E-12, 1E-12, 9E-13, 8E-13, 7E-13, 6E-13, 5E-13, 4E-13, or 3E-13 at 80° C. and 25%, 50%, or 100% relative humidity. In some embodiments, the electrochemical oxygen permeability coefficient is no greater than 2.9E-13, 2.8 E-13, or 2.7E-13 at 80° C. and 50% relative humidity. In some embodiments, the electrochemical oxygen permeability coefficient is no greater than 2.6E-13, 2.5E-13, 2.4 E-13, or 2.3E-13 at 80° C. and 50% relative humidity.

In some embodiments, the fluoropolymer has an oxygen transmission permeability coefficient (as determined by Test Method 2) at 23° C. and zero relative humidity of at least 8.5E-15. In some embodiments, the fluoropolymer has an oxygen transmission permeability coefficient of at least 9E-15, 9.5E-15, or 1E-14. In some embodiments, the oxygen transmission permeability coefficient rate is no greater than 1E-13, 9E-14, 8E-14, 7E-14, 6E-14, 5E-14, 4E-14, 3E-14, 2E-14 or 1.5E-14.

In some favored embodiments, the moieties of the fluoropolymer backbone and pendent groups are selected to provide high conductivity, as determined by the test method described in the examples. The conductivity can vary depending on the relative humidity and temperature. In some embodiments, the fluoropolymer has a conductivity of at least 0.001, 0.005, or 0.010 siemens/cm (S/cm) at 25% relative humidity and 80° C. In some embodiments, the fluoropolymer has a conductivity of at least 0.001, 0.005, 0.010, 0.020, 0.030, 0.040, or 0.050 S/cm at 50% relative humidity and 80° C. In some embodiments, the fluoropolymer has a conductivity of at least 0.001, 0.005, 0.010, 0.020, 0.030, 0.040, 0.050, 0.10, 0.15, 0.20, or 0.25 S/cm at 90% relative humidity and 80° C.

The fluoropolymer can exhibit various combinations of the oxygen permeability and conductivity just described.

High oxygen permeability in the copolymers disclosed herein can be useful to improve the efficiency of fuel cells, for example.

The copolymer of the present disclosure may be useful, for example, in the manufacture of catalyst ink and polymer electrolyte membranes for use in fuel cells or other electrolytic cells. A membrane electrode assembly (MEA) is the central element of a proton exchange membrane fuel cell, such as a hydrogen fuel cell. Fuel cells are electrochemical cells that produce usable electricity by the catalyzed combination of a fuel such as hydrogen and an oxidant such as oxygen. Typical MEA's comprise a polymer electrolyte membrane (also known as an ion conductive membrane (ICM)), which functions as a solid electrolyte. One particular type of ICM is a proton exchange membrane, (PEM). One face of the ICM or PEM is in contact with an anode electrode layer and the opposite face is in contact with a cathode electrode layer. Each electrode layer includes electrochemical catalysts, typically including platinum metal. Gas diffusion layers (GDL's) facilitate gas transport to and from the anode and cathode electrode materials and conduct electrical current. The GDL may also be called a fluid transport layer (FTL) or a diffuser/current collector (DCC). The anode and cathode electrode layers may be applied to GDL's in the form of a catalyst ink, and the resulting coated GDL's sandwiched with a PEM to form a five-layer MEA. Alternately, the anode and cathode electrode layers may be applied to opposite sides of the PEM in the form of a catalyst ink, and the resulting catalyst-coated membrane (CCM) sandwiched with two GDL's to form a five-layer MEA. Details concerning the preparation of catalyst inks and their use in membrane assemblies can be found, for example, in U.S. Pat. Publ. No. 2004/0107869 (Velamakanni et al.). In a typical PEM fuel cell, protons are formed at the anode via hydrogen oxidation and transported across the PEM to the cathode to react with oxygen, causing electrical current to flow in an external circuit connecting the electrodes. The PEM forms a durable, non-porous, electrically non-conductive mechanical barrier between the reactant gases, yet it also passes $H^+$ ions readily.

The copolymer of the present disclosure may be useful as a PEM and/or useful for making a catalyst ink composition. In some embodiments, the copolymer (e.g., as a component of the fluoropolymer dispersion described above) can be combined with catalyst particles (e.g., metal particles or carbon-supported metal particles). A variety of catalysts may be useful. Typically, carbon-supported catalyst particles are used. Typical carbon-supported catalyst particles are 30% to 95% carbon and 5% to 70% catalyst metal by weight, the catalyst metal typically comprising platinum for the cathode and platinum or platinum and ruthenium in a weight ratio of 2:1 for the anode. However, other metals may be useful, for example, gold, silver, palladium, iridium, rhodium, iron, cobalt, nickel, chromium, tungsten, manganese, vanadium, and alloys thereof. To make an MEA or CCM, catalyst may be applied to the PEM by any suitable means, including both hand and machine methods, including hand brushing, notch bar coating, fluid bearing die coating, wire-wound rod coating, slot-fed knife coating, three-roll coating, or decal transfer. Coating may be achieved in one application or in multiple applications. Advantageously, copolymers according to the present disclosure may be useful for making a catalyst layer with one coating application. The catalyst ink may be applied to a PEM or a GDL directly, or the catalyst ink may be applied to a transfer substrate, dried, and thereafter applied to the PEM or to the FTL as a decal.

In some embodiments, the catalyst ink includes the copolymer disclosed herein at a concentration of at least 10, 15, or 20 percent by weight and up to 30 percent by weight, based on the total weight of the catalyst ink. In some embodiment, the catalyst ink includes the catalyst particles in an amount of at least 10, 15, or 20 percent by weight and up to 50, 40, or 30 percent by weight, based on the total weight of the catalyst ink. The catalyst particles may be added to the fluoropolymer dispersion made as described above in any of its embodiments. The resulting catalyst ink may be mixed, for example, with heating. The percent solids in the catalyst ink may be selected, for example, to obtain desirable rheological properties. Examples of suitable organic solvents useful for including in the catalyst ink include lower alcohols (e.g., methanol, ethanol, isopropanol, n-propanol), polyols (e.g., ethylene glycol, propylene glycol, glycerol), ethers (e.g., tetrahydrofuran and dioxane), diglyme, polyglycol ethers, ether acetates, acetonitrile, acetone, dimethylsulfoxide (DMSO), N,N dimethylacetamide (DMA), ethylene carbonate, propylene carbonate, dimethylcarbonate, diethylcarbonate, N,N-dimethylformamide (DMF), N-methylpyrrolidinone (NMP), dimethylimidazolidinone, butyrolactone, hexamethylphosphoric triamide (HMPT), isobutyl methyl ketone, sulfolane, and combinations thereof. In some embodiments, the catalyst ink contains 0% to 50% by weight of a lower alcohol and 0% to 20% by weight of a polyol. In addition, the ink may contain 0% to 2% of a suitable dispersant.

In some embodiments, the copolymer of the present disclosure may be useful for making a polymer electrolyte membrane. The copolymer may be formed into a polymer electrolyte membrane by any suitable method, including casting, molding, and extrusion. Typically, the membrane is cast from a fluoropolymer dispersion (e.g., those described above in any of their embodiments) and then dried, annealed, or both. The copolymer may be cast from a suspension. Any suitable casting method may be used, including bar coating, spray coating, slit coating, and brush coating. After forming, the membrane may be annealed, typically at a temperature of 120° C. or higher, more typically 130° C. or higher, most typically 150° C. or higher. In some embodiments of the method according to the present disclosure, a polymer electrolyte membrane can be obtained by obtaining the copolymer in a fluoropolymer dispersion, optionally purifying the dispersion by ion-exchange purification, and concentrating the dispersion to make a membrane. Typically, if the fluoropolymer dispersion is to be used to form a membrane, the concentration of copolymer is advantageously high (e.g., at least 20, 30, or 40 percent by weight). Often a water-miscible organic solvent is added to facilitate film formation. Examples of water-miscible solvents include lower alcohols (e.g., methanol, ethanol, isopropanol, n-propanol), polyols (e.g., ethylene glycol, propylene glycol, glycerol), ethers (e.g., tetrahydrofuran and dioxane), ether acetates, acetonitrile, acetone, dimethylsulfoxide (DMSO), N,N dimethylacetamide (DMA), ethylene carbonate, propylene carbonate, dimethylcarbonate, diethylcarbonate, N,N-dimethylformamide (DMF), N-methylpyrrolidinone (NMP), dimethylimidazolidinone, butyrolactone, hexamethylphosphoric triamide (HMPT), isobutyl methyl ketone, sulfolane, and combinations thereof.

The present disclosure provides a membrane electrode assembly comprising at least one of a catalyst ink comprising the copolymer of the present disclosure or a polymer electrolyte membrane comprising the copolymer of the present disclosure. The catalyst ink and polymer electrolyte membrane may use the same or different copolymers. In some embodiments, the catalyst ink comprises the copolymer of the present disclosure, and the polymer electrolyte membrane includes a conventional copolymer (e.g., one that does not include the pendent groups described herein.

In some embodiments of the polymer electrolyte membrane of the present disclosure, a salt of at least one of cerium, manganese or ruthenium, or one or more cerium oxide or zirconium oxide compounds is added to the acid form of the copolymer before membrane formation. Typically, the salt of cerium, manganese, or ruthenium and/or the cerium or zirconium oxide compound is mixed well with or dissolved within the copolymer to achieve substantially uniform distribution.

The salt of cerium, manganese, or ruthenium may comprise any suitable anion, including chloride, bromide, hydroxide, nitrate, sulfonate, acetate, phosphate, and carbonate. More than one anion may be present. Other salts may be present, including salts that include other metal cations or ammonium cations. Once cation exchange occurs between the transition metal salt and the acid form of the ionomer, it may be desirable for the acid formed by combination of the liberated proton and the original salt anion to be removed. Thus, it may be useful to use anions that generate volatile or soluble acids, for example chloride or nitrate. Manganese cations may be in any suitable oxidation state, including $Mn^{2+}$, $Mn^{3+}$, and $Mn^{4+}$, but are most typically $Mn^{2+}$. Ruthenium cations may be in any suitable oxidation state, including $Ru^{3+}$ and $Ru^{4+}$, but are most typically $Ru^{3+}$. Cerium cations may be in any suitable oxidation state, including $Ce^{3+}$ and $Ce^{4+}$. Without wishing to be bound by theory, it is believed that the cerium, manganese, or ruthenium cations persist in the polymer electrolyte because they are exchanged with $H^+$ ions from the anion groups of the polymer electrolyte and become associated with those anion groups. Furthermore, it is believed that polyvalent cerium, manganese, or ruthenium cations may form ionic crosslinks between anion groups of the polymer electrolyte, further adding to the stability of the polymer. In some embodiments, the salt may be present in solid form. The cations may be present in a combination of two or more forms including solvated cation, cation associated with bound anion groups of the polymer electrolyte membrane, and cation bound in a salt precipitate. The amount of salt added is typically between 0.001 and 0.5 charge equivalents based on the molar amount of acid functional groups present in the polymer electrolyte, more typically between 0.005 and 0.2, more typically between 0.01 and 0.1, and more typically between 0.02 and 0.05. Further details for combining an anionic copolymer with cerium, manganese, or ruthenium cations can be found in U.S. Pat. Nos. 7,575,534 and 8,628,871, each to Frey et al.

Useful cerium oxide compounds may contain cerium in the (IV) oxidation state, the (III) oxidation state, or both and may be crystalline or amorphous. The cerium oxide may be, for example, $CeO_2$ or $Ce_2O_3$. The cerium oxide may be substantially free of metallic cerium or may contain metallic cerium. The cerium oxide compound may or may not contain other metal elements. Examples of mixed metal oxide compounds comprising cerium oxide include solid solutions such as zirconia-ceria and multicomponent oxide compounds such as barium cerate. Without wishing to be bound by theory, it is believed that the cerium oxide may strengthen the polymer by chelating and forming crosslinks between bound anionic groups. The amount of cerium oxide compound added is typically between 0.01 and 5 weight percent based on the total weight of the copolymer, more typically between 0.1 and 2 weight percent, and more typically between 0.2 and 0.3 weight percent. The cerium oxide compound is typically present in an amount of less than 1% by volume relative to the total volume of the polymer electrolyte membrane, more typically less than 0.8% by volume, and more typically less than 0.5% by volume. Cerium oxide may be in particles of any suitable size, in some embodiments, between 1 nm and 5000 nm, 200 nm to 5000 nm, or 500 nm to 1000 nm. Further details regarding polymer electrolyte membranes including cerium oxide compounds can be found in U.S. Pat. No. 8,367,267 (Frey et al.).

The polymer electrolyte membrane, in some embodiments, may have a thickness of up to 90 micrometers, up to 60 micrometers, or up to 30 micrometers. A thinner membrane may provide less resistance to the passage of ions. In fuel cell use, this results in cooler operation and greater output of usable energy.

In some embodiments, the copolymer of the present disclosure may be imbibed into a porous supporting matrix, typically in the form of a thin membrane having a thickness of up to 90 micrometers, up to 60 micrometers, or up to 30 micrometers. Any suitable method of imbibing the copolymer into the pores of the supporting matrix may be used, including overpressure, vacuum, wicking, and immersion. Any suitable supporting matrix may be used. Typically, the supporting matrix is electrically non-conductive. Typically, the supporting matrix is composed of a fluoropolymer, which is more typically perfluorinated. Typical matrices include porous polytetrafluoroethylene (PTFE), such as biaxially stretched PTFE webs. In another embodiment fillers (e.g., fibers) might be added to the polymer to reinforce the membrane.

To make an MEA, GDL's may be applied to either side of a CCM by any suitable means. Any suitable GDL may be used in the practice of the present disclosure. Typically, the GDL is comprised of sheet material comprising carbon fibers. Typically, the GDL is a carbon fiber construction selected from woven and non-woven carbon fiber constructions. Carbon fiber constructions which may be useful in the practice of the present disclosure may include Toray™ Carbon Paper, SpectraCarb™ Carbon Paper, AFN™ non-woven carbon cloth, and Zoltek™ Carbon Cloth. The GDL may be coated or impregnated with various materials, including carbon particle coatings, hydrophilizing treatments, and hydrophobizing treatments such as coating with polytetrafluoroethylene (PTFE).

In use, the MEA according to the present disclosure is typically sandwiched between two rigid plates, known as distribution plates, also known as bipolar plates (BPP's) or monopolar plates. Like the GDL, the distribution plate is typically electrically conductive. The distribution plate is typically made of a carbon composite, metal, or plated metal material. The distribution plate distributes reactant or product fluids to and from the MEA electrode surfaces, typically through one or more fluid-conducting channels engraved, milled, molded or stamped in the surface(s) facing the MEA(s). These channels are sometimes designated a flow field. The distribution plate may distribute fluids to and from two consecutive MEA's in a stack, with one face directing fuel to the anode of the first MEA while the other face directs oxidant to the cathode of the next MEA (and removes product water), hence the term "bipolar plate." Alternately, the distribution plate may have channels on one side only, to distribute fluids to or from an MEA on only that side, which plate may be termed a "monopolar plate." A typical fuel cell stack comprises a number of MEA's stacked alternately with bipolar plates.

Another type of electrochemical device is an electrolysis cell, which uses electricity to produce chemical changes or chemical energy. An example of an electrolysis cell is a chlor-alkali membrane cell where aqueous sodium chloride is electrolyzed by an electric current between an anode and a cathode. The electrolyte is separated into an anolyte portion and a catholyte portion by a membrane subject to harsh conditions. In chlor-alkali membrane cells, caustic sodium hydroxide collects in the catholyte portion, hydrogen gas is evolved at the cathode portion, and chlorine gas is evolved from the sodium chloride-rich anolyte portion at the anode. The copolymer of the present disclosure may be useful, for example, in the manufacture of catalyst ink and electrolyte membranes for use in chlor-alkali membrane cells or other electrolytic cells.

The copolymer according to the present disclosure may also be useful has a binder for an electrode in other electrochemical cells (for example, lithium ion batteries). To make electrodes, powdered active ingredients can be dispersed in a solvent with the copolymer and coated onto a metal foil substrate, or current collector. The resulting composite electrode contains the powdered active ingredient in the polymer binder adhered to the metal substrate. Useful active materials for making negative electrodes include alloys of main group elements and conductive powders such as graphite. Examples of useful active materials for making a negative electrode include oxides (tin oxide), carbon compounds (e.g., artificial graphite, natural graphite, soil black lead, expanded graphite, and scaly graphite), silicon carbide compounds, silicon-oxide compounds, titanium sulfides, and boron carbide compounds. Useful active materials for making positive electrodes include lithium compounds, such as $Li_{4/3}Ti_{5/3}O_4$, $LiV_3O_8$, $LiV_2O_5$, $LiCo_{0.2}Ni_{0.8}O_2$, $LiNiO_2$, $LiFePO_4$, $LiMnPO_4$, $LiCoPO_4$, $LiMn_2O_4$, and $LiCoO_2$. The electrodes can also include electrically conductive diluents and adhesion promoters.

Electrochemical battery cells (for example, lithium ion batteries) including the copolymer disclosed herein as a binder or solid polymer electrolyte can be made by placing at least one each of a positive electrode and a negative electrode in contact with an electrolyte. Typically, a microporous separator imbibed with liquid electrolyte can be used to prevent the contact of the negative electrode directly with the positive electrode. The copolymer disclosed herein may be suitable to serve as the electrolyte and separator. Once the electrodes are connected externally, lithiation and delithiation can take place at the electrodes, generating a current.

The electrochemical cells can be useful as rechargeable batteries and can be used in a variety of devices, including portable computers, tablet displays, personal digital assistants, mobile telephones, motorized devices (e.g., personal or household appliances and vehicles), instruments, illumination devices (e.g., flashlights) and heating devices. One or more of the electrochemical cells can be combined to provide a battery pack.

EXAMPLES

Unless otherwise noted or readily apparent from the context, all parts, percentages, ratios, etc. in the Examples and the rest of the disclosure are by weight.

| Materials Used in the Examples | |
|---|---|
| Abbreviation | Description and Source |
| $NH_3$ | $NH_3$ Anhydrous Ammonia - Matheson, Basking Ridge, NJ |
| Amberlite; ion exchange resin | Amberlite IR120 H+ ion exchange resin beads - Rohm and Haas, Lenntech, Miami Beach, FL |
| EtOH | Ethanol - V1001, Koptec 200 proof, Decon Labs Inc., King of Prussia, PA |
| nPA | 1-propanol - A19902, Alfa Aesar, Ward Hill, MA |
| DF-MV4S | DF-MV4S: $CF_3CF_2O(CF_2)_4SO_2F$ - 3M MV4S (prepared according to US6624328B1) was direct fluorinated by exposure to fluorine gas by Exfluor (Round Rock, TX). |
| MeOH | Methanol - BDH, VWR Analytical, Radnor, PA |
| TFMSF | TrifluoromethylSulfonyl Fluoride may be prepared following Gramstad, T.; Haszeldine, R. W. *J. Chem. Soc.* 1956, 173. |
| DI $H_2O$ | Deionized Water - Thermoscientific Barnstead GenPure system, 18.2 MOhm - Thermo Scientific, Asheville, NC |
| TEA | Triethylamine - TX1200-5, EMD Millipore Corp, Darmstadt, Germany |
| Dry TEA | Triethylamine - 471283-100 mL - Sigma-Aldrich, St. Louis, MO |
| PPDSF | Perfluoropropane-1,3-disulfonyl Fluoride (PPDSF) may be prepared according to U.S. Pat. No. 2,732,398. |
| ACN | Acetonitrile - anhydrous, 271004-1L, Sigma-Aldrich, St. Louis, MO |
| Toluene | Toluene - OmniSolv, TXZ0737-1, EMD-Millipore Corp., Darmstadt, Germany |

Film Coating Method

Films were prepared using an Automatic Film Applicator (AFA) 1132N drawdown machine (TCQ Sheen, Metamora, MI) set at 50 mm/sec speed for a full-length coating distance. Upon the drawdown machine coating surface was placed a glass plate (12"×17"×⅛", 30.5 cm×43.2 cm×0.32 cm) and 2 mil (51 micrometer) silicone-coated polyethylene terephthalate (PET) release liner. The glass and liner were cleaned of any debris with isopropyl alcohol (IPA). The release liner and plate were both secured under the drawdown mechanism by the built-in clip. A 4-inch (10.2 cm) milled coating notch bar square (Gardco, Paul N. Gardner Co., Pompano Beach, FL) was placed upon the silicone-coated PET release liner, fluoropolymer dispersion was poured in front of the notch bar, and the ionomer dispersion was coated at the set speed and distance. The release liner was taped at four corners so it would not lift in the forced air oven. The glass plate with release liner and coating was pulled from the drawdown machine, covered with an aluminum pan to prevent debris from falling into the coating, and placed upon ceramic supports set on metal wire shelving in a forced air oven (Despatch, Minneapolis, MN) set at 120° C. for 30 minutes. The release liner and coating upon it were removed from the glass, placed into an aluminum pan, covered with another aluminum pan, and placed back into the oven for 15 minutes at a setting of 140° C. The temperature was ramped to 160° C. for a 10-minute hold. The film was cooled and characterized by micrometer measurement.

Test Methods

Sulfonamide Content Determination

Sulfonamide contents of the produced polymer dispersions were measured by a nuclear magnetic resonance spectrometer (obtained under the trade designation "BRUKER A500 NMR", from Bruker Corp, Billerica, MA) after polymer was dried and dispersed into perdeuterated solvents MeOD or DMSO-$d_6$ and calculated by comparing the $^{19}F$ spectrum $CF_2$ peak integrations associated with sulfonyl fluoride, sulfonamide, bis(sulfonyl)imide and sulfonic acid functional groups that are found between −107 and −126 ppm.

Melt Flow Index

The melt flow index (MFI) of an as-prepared polymer, reported in g/10 min, was measured with a Goettfert MPD, MI-Robo, M14 melt indexer (Buchen, Germany) following the procedure described in DIN EN ISO 1133-1 at a support weight of 5.0 kg and a temperature of 265° C. The MFI was obtained with a standardized extrusion die of 2.1 mm in diameter and a length of 8.0 mm.

Proton Conductivity

The dried films were evaluated using a standard, in-plane, 4-point probe conductivity apparatus with platinum electrodes. The cell was electrically connected to a potentiostat (Model 273, Princeton Applied Research, Oak Ridge, TN) and an Impedance/Gain Phase Analyzer (Solartron SI 1260, Ametek Inc., Oak Ridge, TN). AC impedance measurements were performed using ZPLOT and ZVIEW software (Scribner Associates Inc., Southern Pines, NC). Temperature and relative humidity (RH) were controlled with a constant humidity oven (Model 1000H from Test Equity, Moorpark, CA). In the test method, an initial condition of 70% RH at a set temperature of 80° C. was selected, then the % RH was decreased incrementally to 25% RH, then increased up to 90% RH. Each condition was maintained for 90 minutes. The conductivity, siemens/cm (S/cm) is reported at various humidities as the humidity was increased.

Equivalent Weight (EW) Determination by Titration of Bulk Films

The dried films of approximately 0.5-0.7 g were weighed and added to 50 g 1 M NaCl(aq). The membranes were ion exchanged for more than 4 hours with gentle agitation by rolling or shaking in a bottle. The HCl generated was titrated with 0.03 M NaOH to determine the ion exchange capacity of films with known mass.

Oxygen Transmission Permeability Coefficient—Test Method 1

Oxygen permeability measurement of the dried ionomer films were made according to the method described in the paper by Zhang et al. (J. Electrochem. Soc, 160, F616, 2013) utilizing the materials and parameters described below:

|  |  | Material, Conditions | Description and Source |
|---|---|---|---|
| ANODE | Anode Catalyst | IrOxEA30E | 30 wt % IrOx on graphitized Ketjin carbon, Tanaka Kikinzoku Kogyo K.K. (TKK), Tokyo, Japan |
|  | Catalyst loading | 0.3 mg Ir/cm$^2$ |  |
|  | Anode Ionomer | 3M800EW | 800 g/eq equivalent weight perfluorosulfonic acid, 3M Company, Maplewood, MN |
|  | Ionomer/carbon (I/C) ratio | 0.8 |  |
|  | Anode Method | INK/DECAL |  |
| CATHODE | Cathode Catalyst | SA50BK | 50 wt % Pt on Ketjin carbon, (NECC, Nippon Engelhard Chemcat Corporation, Tokyo, Japan) |
|  | Cathode loading | 0.4 mg Pt/cm$^2$ |  |
|  | Cathode ionomer | 3M725EW | 725 g/eq equivalent weight perfluorosulfonic acid, 3M Company |
|  | I/C ratio | 1.0 |  |
|  | Cathode Method | INK/DECAL |  |
| MEM | Baseline | 3M800 | 800 g/eq equivalent weight perfluorosulfonic acid, 3M Company, |
|  | Membrane thickness | 20 micrometers |  |
|  | Novel ionomer membrane thickness | 20-50 micrometers |  |
| GDL | Anode gas diffusion layer (GDL) | 3M 2979 | Carbon fiber paper with microporous layer, 3M Company, Maplewood, MN |
|  | Cathode GDL | 3M 2979 | Carbon fiber paper with microporous layer, 3M Company, Maplewood, MN |
| Data collection method | Cell Area | 50 cm$^2$ |  |
|  | Conditioning process | Zhang method |  |
|  | Voltage Range | 0.4-1.2 V One data point every 0.1 V from 0.4 V to 0.9 V, then 0.05 V from 0.9 V to 1.2 V |  |
|  | Time per point | 2.5 min |  |

Iridium Oxide (IrOx) dispersed at 30 wt % on graphitized carbon (Tanaka) was used as the anode material. Both the anode and cathode inks were prepared by mixing the components of the table below. In each case inks were made in a nitrogen-inerted enclosure. The catalyst was added first with water, followed by additional solvents and ionomer solution.

| Ink Components | Anode | Cathode |
| --- | --- | --- |
| Catalyst | IrOxEA30E (TKK) | SA50BK (NECC) |
| Ionomer | 3M800 | 3M725 |
| I/C ratio | 1.0 | 1.0 |
| wt % solids | 15 | 11.0 |
| Grams catalyst | 5 | 8 |
| Grams ionomer solution | 14.68 As 20 wt % ionomer in solution of 60/40 wt % n-propyl alcohol (nPa)/water | 20.76 As 20 wt % ionomer in solution of 60/40 wt % nPa/water |
| Grams water added | 3.45 | 10.39 |
| Grams nPa added | 8.81 | 29.59 |
| Grams t-butanol added | 17.63 | 29.59 |
| Grams Propylene Glycol Butyl Ether (PGBE) added | 2.21 | 9.60 |

The catalyst ink was mixed by ball milling with 6 mm ceramic $ZrO_2$ beads (from Glen Mills Inc., Clifton, NJ) for 48 hours after combining all components. Using a 3M Company in-house pilot-scale manufacturing line, the anode and cathode electrodes were coated on a 1 mil polyethylene terephthalate (PET) film containing a silicone release surface and dried at up to 145° C. The Ionomer Membrane to test was placed between the cathode catalyst layer decal prepared above and an anode catalyst layer decal, as is common in the industry, with the liners on the outside of the construction and the catalysts facing the Ionomer Membrane. The construction was hot roll laminated using heated steel 6 inch (15.2 cm) diameter rollers heated to 325° F. (163° C.) at a roller speed of 1.2 feet per minute (0.37 m/s) with an air pressure of 100 pounds per square inch (0.69 MPa) applied to the laminator drum. The silicone coated PET release liner was removed from the construction immediately after lamination to form a CCM.

Assembling for Test at a Single Cell Fuel Test Station.

The CCM was installed between two GDLs and placed directly into a 50 $cm^2$ single fuel cell (obtained under the trade designation "50 CM2 CELL HARDWARE" (50SCH) from Fuel Cell Technologies, Albuquerque, NM), with quad serpentine graphite flow fields, and with gaskets selected to give 10% compression of the gas diffusion layers. After assembly, the test cell was connected to a test station (obtained under the trade designation "SINGLE FUEL CELL TEST STATION" from Fuel Cell Technologies, Inc.) A supply of hydrogen gas was provided to the anode side and air was supplied to the cathode side. The test station was used to control the applied cell voltage or current density. All tests described below were done in the same electrochemical cell, using the same type of ion exchange membrane and cathode construction.

Data generated required corrections for electrical shorting across the membrane, corrections for membrane thickness, and for water partial pressure, as described in Zhang et al. The resulting data then allowed the extrapolation of oxygen permeability in $mol \cdot cm \cdot s^{-1} \cdot cm^{-2} \cdot kPa^{-1}$. This method refined the bulk film $O_2$ permeability measurement described by Zhang et al. to best achieve repeatable and stable data for multiple membrane types. The key difference from the Zhang method was changing the Pt oxygen reduction reaction (ORR) cathode electrode to contain more Pt and more active Pt. Thus, 0.4 mg $Pt/cm^2$ NECC SA50BK Platinum on Ketjin-carbon electrodes were used.

Oxygen Transmission Permeability Coefficient—Test Method 2

The dried films, still on their backing, were masked to 5 $cm^2$ area (masked on both sides) with adhesive-backed aluminum masks (TM Electronics, Inc., Davens, Massachusetts, PML-800815) after cutting a 4 inch (10.2 cm) diameter circle sample with an AccuCut die and AccuCut MARK IV machine press (Omaha, NE.) Masks were first applied to the film open-to-air side, keeping one side of the film against the release liner substrate that it was coated upon. A weighted roller was used to apply force on the mask to ensure a good seal around the perimeter of the active area of the sample. The release liner was then removed, and a second mask was applied aligned to the first mask, and a weighted roller was again used to ensure a good seal between the masks and sample. An oxygen permeation analyzer (8001L Oxygen Permeation Analyzer, Systech Illinois Instruments Company, Johnsburg, IL) was calibrated with 88.6 ppm $O_2$ in $N_2$ calibration gas (Oxygen Services Company, SG3 00LG025, certified, St. Paul, MN), or was calibrated against a film having a certified oxygen transmission rate (OTR) value. Masked samples were mounted into cells, running two samples per test, after applying vacuum grease (Apiezon, Manchester, UK) to the perimeter of each cell to ensure a good seal between the sample and the instrument nitrogen side. Ultra-high purity oxygen (99.996%, Oxygen Services Company, SG3 00MG003) test gas and ultra-high purity nitrogen (99.999%, Oxygen Services Company, NIT 304UHP) carrier gas were obtained from Oxygen Services Company. Measurements began after a tubing purge and leak check to ensure cells were properly sealed. Permeation rates were sampled at 20-minute intervals and the tests were stopped when a change of 1% or less in OTR was determined by the instrument between sampling intervals. OTR values provided as results from the instrument were transformed from $$\frac{cc_{O_2}}{m^2 \cdot day}$$

to an oxygen permeability coefficient in units of $$\frac{mol_{O_2} \cdot cm_{thickness}}{cm^2_{test\ area} \cdot s \cdot kPa_{O_2}},$$

utilizing the thickness of the sample ($cm_{thickness}$), test area of the sample ($cm_{test\ area}^2$), ideal gas law conversion to get moles of oxygen from mL ($mol_{O_2}$), and 1 atm difference in partial pressure of oxygen ($kPa_{O_2}$) from test to carrier gas side in a non-humidified test, per unit time in seconds (s). Test temperature was designated per sample.

Comparative Example A (CE-A)

A copolymer having the following structure:

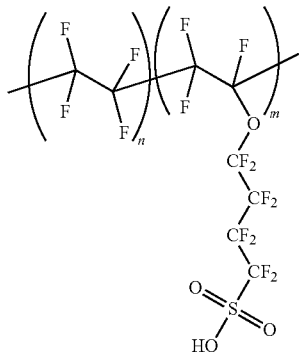

The copolymer had an equivalent weight of 798 g/mol, 19.2 mol % of polymerized sulfonate functional monomer and 80.8 mol % polymerized tetrafluoroethylene comonomer.

A film of CE-A was prepared by redispersing the ionomer in aqueous methanolic solvent to produce a from a 40% solids dispersion of the ionomer. The dispersion of ionomer was coated onto a 2 mil (51 micrometer) polyimide liner (KAPTON, available from DuPont (Wilmington, DE)) at a constant flow rate using a coating die and a line speed of about 1 meter per minute, with a target dry thickness of 30 micrometers, using a pilot-scale coater manufactured by Hirano Entec Ltd. (Nara, Japan) having four drying zones arranged sequentially in a down-web direction and set to 50° C., 100° C., 120° C., and 145° C., respectively. The film was then subjected to a second heat treatment of 200° C. for 10 minutes. Conductivity and oxygen permeability measurements (as described in the test methods) were conducted on the film.

Preparation of Fluoropolymer Comprising Pendant Groups with Bis(Sulfonyl)Imide Moieties and Perfluoroether Terminal Group i) Preparation of First Fluoropolymer Intermediate, $FSO_2$—Terminated Pendent Groups $FSO_2C_4F_8OCF=CF_2$ was prepared as described in U.S. Pat. No. 6,624,328. Tetrafluoroethylene and $FSO_2C_4F_8OCF=CF_2$ were copolymerized as described in U.S. Pat. No. 7,348,088. The resulting $FSO_2$ terminated fluoropolymer intermediate had an equivalent weight of 798 g/mol, 19.2 mol % of polymerized $FSO_2C_4F_8OCF=CF_2$ monomer and 80.8 mol % of polymerized tetrafluoroethylene comonomer, and a melt flow index of 32 g/10 min at 265° C., 5 kg mass. Fluoropolymer of particle size <1 mm, obtained by sieving through a wire mesh, was used for the subsequent reaction. In the subsequent reaction steps the moles of polymerized tetrafluoroethylene comonomer (80.8 mol %) and moles of polymerized $FSO_2C_4F_8OCF=CF_2$ monomer (19.2 mol %) remain the same. However, the molecular weight of the majority of pendent groups increase due to covalently bonding various moieties as described in the forthcoming reaction schemes.

ii) Preparation of Second Fluoropolymer Intermediate, —$SO_2NH^-TEAH+$ Terminated Pendent Groups Intermediate Fluoropolymer 1 was functionalized using a larger scale version of the process of example PEI of U.S. Pat. No. 9,419,300, in which Intermediate Fluoropolymer 1 was converted to a sulfonamide functionalized polymer of similar composition with sidechains having 13:1 sulfonamide (—$SO_2NH_2$) to sulfonic acid ($SO_3H$) functionality by NMR method. In the present process, however, the sulfonamide ammonium intermediate was reacted with triethylamine and slowly heated under reduced pressure to remove the ammonia. In a nitrogen-inerted vacuum oven, the dispersion was dried upon a PTFE release liner at 85° C., then was used for the subsequent reaction. The product was the triethylammonium salt of the anionic form of the polymer, which nominally has the structure shown below.

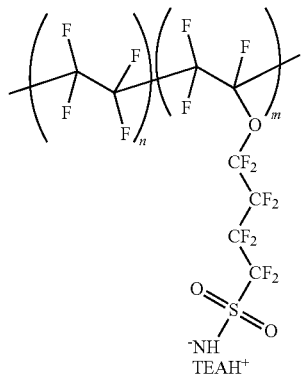

iii) Preparation of Third Fluoropolymer Intermediate, —$SO_2N^-(TEAH^+)SO_2C_3F_6SO_2F$ terminated Pendent Groups To a dry 3 L glass reactor fitted with air-driven stirrer, addition funnel, septum, and nitrogen supply, was charged 235 g of the dried Intermediate Fluoropolymer 2 followed by 311.78 g dry TEA added by cannula through the septum. Began agitating and added 953 g ACN while cooling over an ice-water bath. Stirred mixture fast enough to suspend polymer particles and monitored temperature with thermocouple in reaction mixture. Transferred 325.75 g PPDSF to addition funnel and began adding once reaction mixture reached 3° C. Added entire amount dropwise over 20 minutes, maintaining a reaction temperature of 4° C. Agitated and allowed to slowly warm to room temperature overnight. Polymer had swollen and made the suspension very elastic. Diluted with ACN to 3 L of total suspension, which again thickened with swollen polymer. Heated in 80° C. bath, which condensed a small amount of polymer. The thick suspension was transferred in small portions, withholding the condensed polymer chunk from undergoing further process steps, into neat toluene where it precipitated out of solution, ensuring the toluene-swollen polymer suspension volume ratio was at least 3:1. Solids were then placed in a 1-gallon (3.8 L) jug and washed in toluene at 50% (w/w) for 24 hours to extract any residual ACN. The polymer and wash solvent slurry were rotary evaporated in approximately 340 g batches at 43° C. and dynamic vacuum to remove solvent, collecting 221.14 g of the —$SO_2N^-$(TEAH$^+$)$SO_2C_3F_6SO_2F$ terminated fluoropolymer intermediate produced. The nominal formula is shown below.

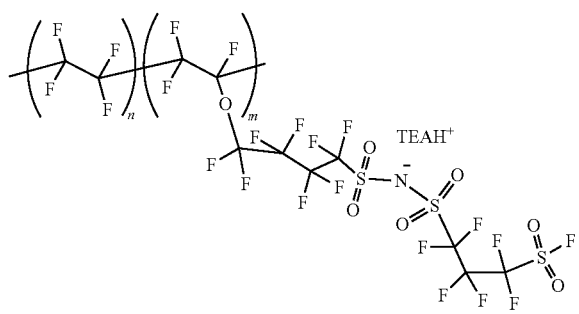

iv) Preparation of Fourth Fluoropolymer Intermediate, —SO$_2$NHSO$_2$C$_3$F$_6$SO$_2$NH$_2$ Terminated Pendent Groups To a dry and nitrogen-inerted 1 L stirred reactor (Parr Company, Moline, IL) was added 70.5 g Intermediate Fluoropolymer 3 that had been frozen with liquid nitrogen and pulverized with mortar and pestle until a fine powder was obtained. The vessel was evacuated by rotary vane pump. Charged 438.7 g ACN by cannula and chilled the reactor over an isopropyl alcohol-dry ice bath. Once reaction mixture reached −10° C., rapidly charged 102 g liquid ammonia by diptube transfer, temperature increased autogenously to 3° C. for five minutes followed by rapid cooling; allowed reaction to agitate over the cold bath and slowly warm to room temperature overnight. Vented reactor for 30 minutes and poured reaction mixture into a round-bottomed flask (RBF).

v) Optional Purifying and Ion Exchanging the Cation

Added 250 mL 2 M LiOH (aq) and removed water and triethylamine by rotary evaporation to recover 61.75 g solids. Over two dispersion runs, all solids were charged to a stirred 600 mL Parr Reactor and dispersed at 250° C. for 2-hour hold in DI H$_2$O with 5 equivalents of LiOH·H$_2$O (s) dissolved at agitation rate of 250 RPM to obtain 6.89 wt % solids dispersion. Dispersion was filtered through 1 micrometer glass microfiber syringe filters (4524T, Pall Corporation, Port Washington, NY) before purification by tangential flow filtration and ion exchanging the aqueous dispersion over Amberlite IR 120 H+ ion exchange resin. The dispersions were combined, and ionomer dispersion was washed by diafiltration through a hollow fiber tangential flow filtration (TFF) module (S02-S050-05-N, PS/50 kD, Spectrum, Inc., Rancho Dominguez, CA) at an isovolumetric amount of 500 mL and 20 psig backpressure. Washed with 1000 mL DI H$_2$O followed by 4 L 50/50 MeOH/H$_2$O (w/w), adding 50 mL 2 M LiOH (aq) in a single portion to the retentate after the first 500 mL of MeOH/H$_2$O was added. Followed aqueous methanol washes by two volumes of DI H$_2$O. A 10 wt % dispersion was obtained for the bulk collection with a lower wt % wash of the filtration system collected separately. A polycarbonate column (2.55 cm (r)×65 cm (h)) was filled approximately half full (1.8 mol acid sites) with Amberlite resin. This resin was washed with 20 L DI H$_2$O prior to ion exchanging the polymer dispersion. Ionomer dispersion and filtration system wash were passed over the resin in a single pass and collected as pH 0-1 (colorimetric pH indicator strips, 8880-1, Ricca Chemical Co, Arlington, TX) dispersion. Collected the acidic polymer and dried in forced air oven to remove water at approximately 60° C. to obtain 50.55 g final protonated sulfonamide-terminated form polymer. The acidified form of Intermediate Fluoropolymer 4 was characterized by $^{19}$F NMR according to Supplemental Information of J. Am. Chem. Soc. 2019, 141, 13547-13561. As determined by $^{19}$F NMR, sidechain chemistries included 8.5 mol % sulfonic acid terminated sidechain (—SO$_3$H), 6.0 mol % sulfonamide terminated sidechain (—SO$_2$NH$_2$), and 85.5 mol % (—SO$_2$NHSO$_2$C$_3$F$_6$SO$_2$NH$_2$) terminated sidechains. In other words with respect to the total fluoropolymer, of the 19.2 mol % of total polymerized monomer bearing pendent sulfonyl fluoride of the first fluoropolymer intermediate, 16.4 mol % were now (—SO$_2$NHSO$_2$C$_3$F$_6$SO$_2$NH$_2$) terminated, while 1.6 mol % were (—SO$_3$H) terminated and 1.2 mol % were (—SO$_2$NH$_2$) terminated. The nominal structure is shown below.

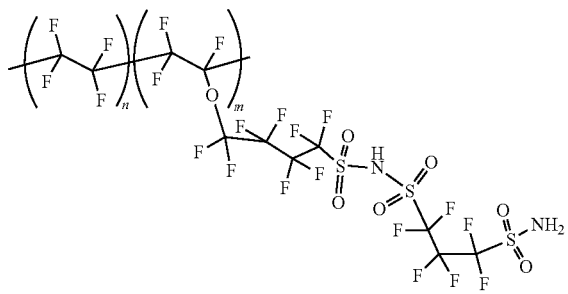

vi) Preparation of Perfluoroether Terminated Fluoropolymer

To a 1 L glass pressure vessel, a large stirbar (Fisherbrand 14-513-55, egg-shaped, Fisher Scientific, Waltham, MA) and 50.55 g of the acid form of Intermediate Fluoropolymer 4 were charged. The vessel top was fitted with a rubber septum and N$_2$(g) was flowed in and out through syringe needles. 54.28 g dry TEA (471283-100 mL, Sigma Aldrich, St. Louis, MO) was charged into the reactor via cannula followed by 257.48 g ACN by the same method. Mixture was allowed to bathe in the reagents for 24 minutes to allow polymer to neutralize to the triethylammonium form and swell. See the structure below.

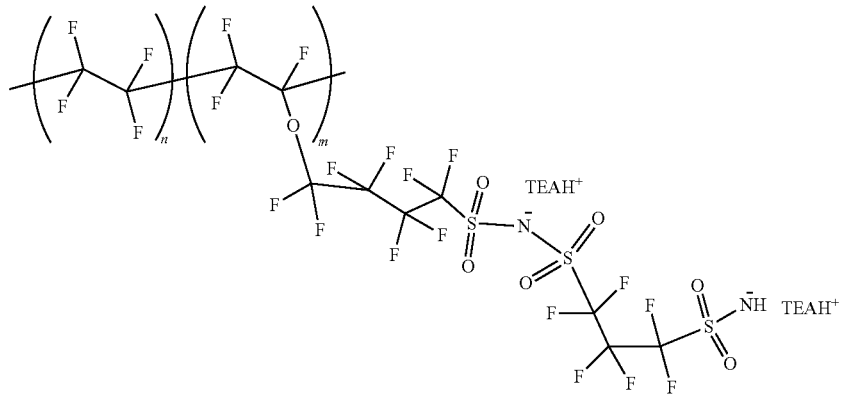

97.61 g CF₃CF₂OC₄F₈SO₂F (DF-MV4S) was added rapidly with observable exotherm upon stirring. The pressure vessel was capped and heated in a silicone oil bath heated with a heater coil (Mange SF100, 1 kW at 115 V) controlled by temperature controller (Model 410A, J-KEM Scientific, St. Louis, MO) set at 60 V output upon a hotplate-stirplate (VWR, Radnor, PA) to agitate the mixture. The bath was held at 60° C. and reactor was set into the bath after 15 minutes of stirring at ambient conditions. As the polymer reacted and swelled the mixture became more difficult to stir. Stirbar was replaced with a larger octagon stirbar after 35 minutes to allow for adequate mixing. The reaction mixture agitated overnight and appeared homogenous and transparent orange-brown. Mixture continued to agitate for another day and apparent viscosity increased. Continued stirring and heating for a total of nineteen days. Polymer dispersion was allowed to cool and was slowly decanted from reaction flask into 1 L toluene being agitated by metal disperser blade at 400 RPM. Polymer precipitated into wispy white-tan solids leaving dark orange solvent. Precipitate was filtered over glass fritted funnel (Whatman GF-B, GE Healthcare UK Limited, Buckinghamshire, UK). Solvent was further evaporated in forced air oven at 70° C. for 17.25 hours; crust layer formed and not all toluene evaporated. The polymer was swollen in 250 mL nPA in a 2 L RBF and treated with 10 equiv LiOH from 2 M LiOH (aq) and another 250 ml nPA to further swell the polymer. TEA was removed at 60° C. under dynamic vacuum on a rotary evaporator. Removed bulk solvent (dried to 376.77 g swollen gels) and added 754.56 g 60/40 nPA/H₂O (w/w) solvent. The mixture of gels and dispersed polymer was split in half and each aliquot was treated with shear mixer (SL2T laboratory mixer emulsifier, Silverson, Buckinghamshire, England) for five minutes at 5000 RPM or less to break down undispersed polymer through 5 mm pore-size screen, followed by treatment with ultrasonic probe (Ultrasonic Processor, Ace Glass Inc., Vineland, NJ) for 5 minutes at half-max amplitude and 3 minutes at full-max amplitude to obtain a hazy light-yellow viscous visibly-gel-free dispersion. Finally, treated dispersions for another 5 minutes with shear mixer fitted with 1 mm pore-size screen. Heated dispersion over a hotplate-stirrer (RCT basic, IKA Werke, Wilmington, NC) at stirring setting 4, temperature setting 100. After 30 minutes, dispersion temperature reached 46.8° C. and fine LiOH salts could be observed as a suspension during the mixing. Diluted mixture with 200 mL 70/30 EtOH/H₂O (w/w) and poured into 2 L bottle for TFF purification of salts and small molecule byproducts. Concentrated the two dispersions added into a single 2 L bottle down to 1 L isovolumetric process volume and began diafiltration using a total of 5 L 70/30 EtOH/H₂O (w/w) wash solvent to obtain a dispersion of the fluoropolymer depicted below with Li+ counterions in 70/30 EtOH/H₂O (w/w). ¹⁹F NMR of polymer sample dried under nitrogen and dispersed into MeOD was obtained and showed approximately 91.7% of the final fluoropolymer sidechain composition with perfluoroalkylether terminated sidechains (as depicted below) and 8.3% terminated with —SO₃Li.

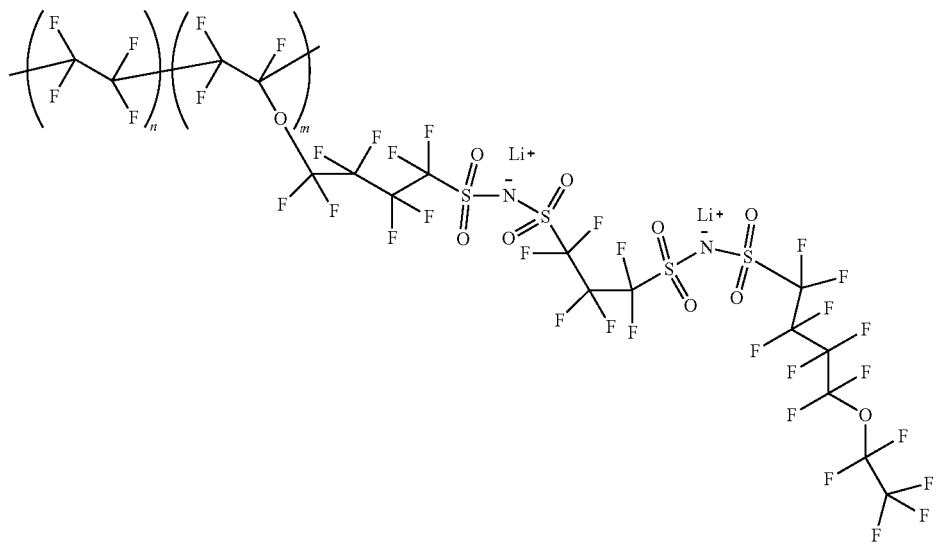

Collected the dispersion and filtration system wash and ion exchanged the Li+ counterions for H⁺ over approximately 10 equivalents Amberlite IR-120 H+ beads that had been pre-rinsed with 4 gallons DI H₂O. Rotary evaporated all collections to remove bulk solvent at 40° C., dynamic vacuum, and finished drying under warm flowing N₂(g) to yield 59.96 g (0.040 mol, 87.1% yield) of the resulting fluoropolymer depicted as follows:

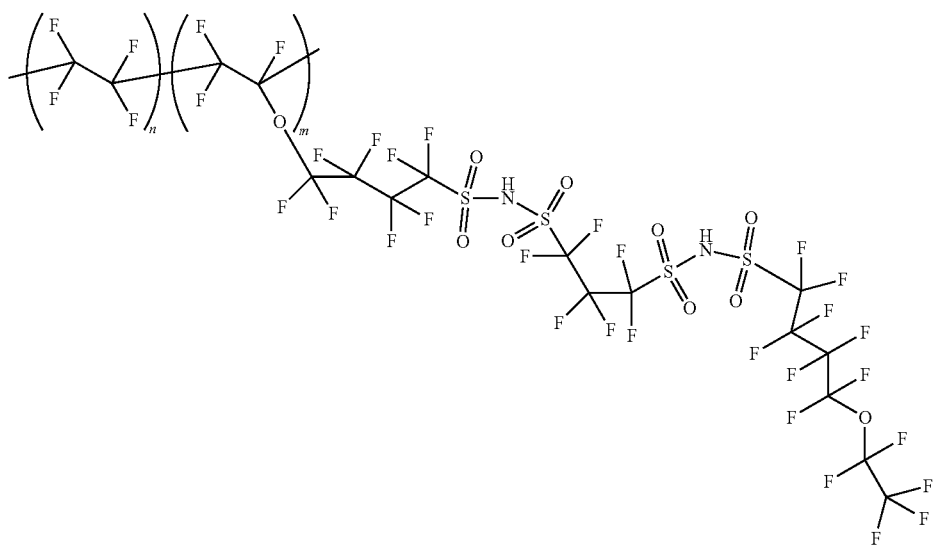

Preparation of Perfluoroether Terminated Fluoropolymer Dispersion

A dispersion was prepared by dispersing approximately 5 g of the perfluoroether terminated fluoropolymer in 60/40 nPA/H$_2$O (w/w) solvent by rolling in a 60 ml bottle with a stir bar for increased agitation until dispersed. The dispersion was 10.5 wt. % solids.

The 10.50 wt. % solids dispersion was coated onto release liner at 25 mil (0.64 mm) wet gap, as indicated in the Film Coating Method, and utilized the solid film in a titration analysis to determine the equivalent weight of the perfluoroether terminated fluoropolymer. Following the Equivalent Weight (EW) Determination by Titration of Bulk Films method, titrated two aliquots of two separate samples; having an average equivalent weight of 783.4 g/mol.

The 10.50 wt. % solids dispersion was coated onto release liner at 25 mil (0.64) wet gap, as indicated in the Film Coating Method, after degassing for several hours at slightly reduced pressure in an identical solvent rich environment within a desiccator. Coated film was characterized to be 29 micrometers dry and fully intact without surface defects. Film was characterized for oxygen permeability, in units of mol·cm·s$^{-1}$·cm$^{-2}$·kPa$^{-1}$, according to the electrochemical and OTR methods described above. The ionic conductivity of the film was also measured. Results are in the tables below.

| Oxygen Permeability Coefficient (mol · cm · s$^{-1}$ · cm$^{-2}$ · kPa$^{-1}$) | | | | |
|---|---|---|---|---|
| | Test Method 1 (80° C.) | | Test Method 2 (23° C.) | |
| Polymer | CE-A | Fluoropolymer 1 | CE-A | Fluoropolymer 1 |
| % RH | O$_2$ perm | O$_2$ perm | O$_2$ perm | O$_2$ perm |
| 100 | 2.00E−13 | 2.89E−13 | | |
| 50 | 1.29E−13 | 2.63E−13 | | |
| 25 | 8.66E−14 | 2.21E−13 | | |
| 0 | | | 6.38E−15 | 1.21E−14 |

| | | Ionic conductivity | | | | | | | |
|---|---|---|---|---|---|---|---|---|---|
| 80° C. Conductivity | Relative Humidity (%) | 25 | 30 | 40 | 50 | 60 | 70 | 80 | 90 |
| Fluoropolymer 1 | Avg S/cm | 0.0134 | 0.0188 | 0.0329 | 0.0523 | 0.0782 | 0.1138 | 0.1667 | 0.2624 |
| CE-A | Avg S/cm | 0.0189 | 0.0254 | 0.0418 | 0.0628 | 0.0891 | 0.1230 | 0.1696 | 0.2470 |

What is claimed is:

1. A fluoropolymer comprising pendent groups according to the formula:

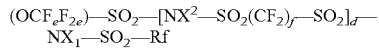
NX$_1$—SO$_2$—Rf wherein

Rf is a perfluoroether;

e and f independently range from 2 to 6;

d 1, or greater than 1; and

X$^1$ and X$^2$ are independently cationic counterions.

2. The fluoropolymer of claim 1 wherein Rf is a perfluoroether having 3 to 12 perfluorinated carbon atoms.

3. The fluoropolymer of claim 1 wherein X$^1$ and X$^2$ are hydrogen ion.

4. The fluoropolymer of claim 1 wherein the fluroropolymer further comprises up to 10 mol % of pendent groups comprising at least one bis(sulfonyl)imide moiety and a terminal group selected from sulfonic acid and sulfonamide.

5. The fluoropolymer of claim 1 wherein the fluoropolymer comprises 5 to 50 mol % of the pendent groups.

6. The fluoropolymer of claim 1 wherein the fluoropolymer comprises a backbone comprising 50 to 95 mol % polymerized units of —[CF$_2$—CF$_2$]—.

7. The fluoropolymer of claim 1 wherein the fluoropolymer has an electrochemical oxygen permeability coefficient at 80° C. of at least i) 1.1E-13 at 25% relative humidity;

ii) 1.5E-13 at 50% relative humidity;

iii) 2.2E-13 at 100% relative humidity; or a combination thereof.

8. The fluoropolymer of claim 1 wherein the fluoropolymer has an oxygen permeability coefficient at 23° C. and zero relative humidity of at least 8.5E-15.

9. The fluoropolymer of claim 1 wherein the fluoropolymer has an ionic conductivity at 80° C. of at least i) 0.001, 0.005, or 0.010 S/cm at 25% relative humidity;

ii) 0.010, 0.020, 0.030, 0.040, or 0.050 S/cm at 50% relative humidity;

iii) 0.050, 0.10, 0.15, 0.20, or 0.25 S/cm at 90% relative humidity; or a combination thereof.

10. The fluoropolymer of claim 1 wherein the fluoropolymer is dispersed in an organic solvent.

11. The fluoropolymer of claim 1 wherein the fluoropolymer is dispersed in an aqueous solvent or water and water-miscible organic solvent mixture.

12. A catalyst ink comprising the fluoropolymer of claim 1.

13. A polymer electrolyte membrane prepared from the fluoropolymer of claim 1.

14. A membrane electrode assembly comprising the fluoropolymer of claim 1 as a catalyst ink or as a polymer electrolyte membrane.

* * * * *